Dec. 9, 1952     R. L. FOLSOM     2,620,562
ARTIFICIAL TOOTH
Filed Feb. 12, 1949     2 SHEETS—SHEET 1
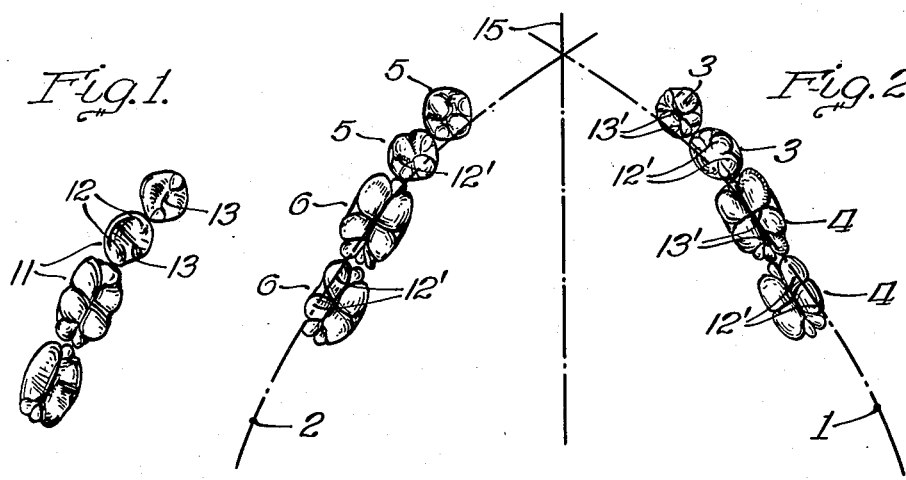
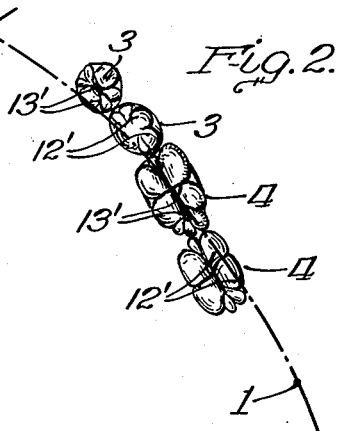
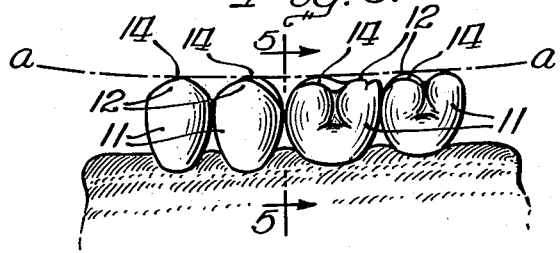
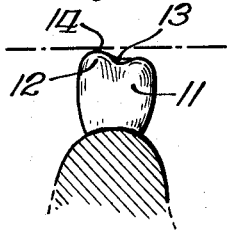
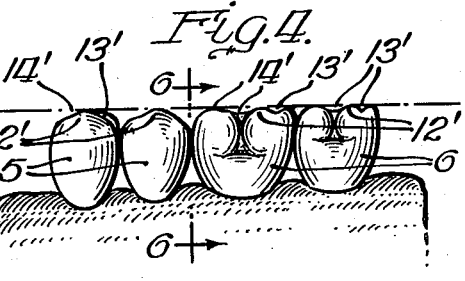
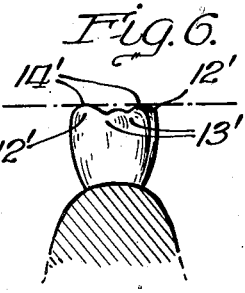
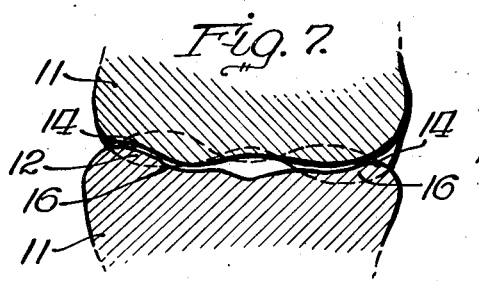
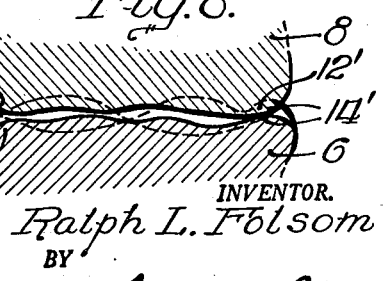
INVENTOR.
Ralph L. Folsom
BY
Brown, Jackson, Boettcher & Dienner
Attys Dec. 9, 1952 R. L. FOLSOM 2,620,562
ARTIFICIAL TOOTH Filed Feb. 12, 1949 2 SHEETS—SHEET 2

INVENTOR.
Ralph L. Folsom
BY
Brown, Jackson, Boettcher & Dienner
Att'ys

Patented Dec. 9, 1952

2,620,562

UNITED STATES PATENT OFFICE 2,620,562

ARTIFICIAL TOOTH

Ralph L. Folsom, Salt Lake City, Utah, assignor to Austenal Laboratories, Incorporated, New York, N. Y., a corporation of New York Application February 12, 1949, Serial No. 76,046

7 Claims. (Cl. 32—2)

This invention relates to artificial teeth.

The invention has particular relation to improvements in the formation of posterior teeth (i. e., bicuspid and molar teeth), and has reference especially to improvements in the formation of the occlusal surfaces of such teeth.

A study of comparative anatomy reveals that the occlusal form provided by nature, while having a wide variation, was designed with an efficiency peculiar to the diet of the animal. The carnivorous or meat-eating animals have sharp cusps whose close interdigitation and condylar mechanism permits little, if any, lateral excursion. Their occlusal form presents a cutting mechanism.

The herbivorous or plant eating animals possess a relatively flat occlusal form and a condyle joint which allows wide lateral movements with efficient grinding action.

The omnivorous type, including man, subsists on a mixed diet and has a modified cusp formation on the occlusal surfaces of the posterior teeth, and a more complex temperomandibular articulation.

Since the omnivorous group requires both the cutting action of the first type and the grinding action of the second type, man's mandibular excursions are a combination of the other two. In other words, his masticatory act may be divided into two distinct phases; first, the mandible moves laterally and pierces the food with the buccal cusps of the upper and lower posterior teeth opposing each other and the lingual cusps in corresponding relation. This is the cutting action, and its efficiency is measured by the sharpness of the cusps, with the force directed in the long axis of the teeth. Upon cusp contact the mandible moves laterally into centric, with a grinding action.

Nature's pattern of occlusal form, with the teeth embedded firmly in the alveolar process, furnishes an efficient masticating mechanism, provided no abnormality is present. However, in natural teeth, the cusps on the occlusal surfaces of the lower posterior teeth are on a curve which is concave downwardly from front to rear, and the cusps on the occlusal surfaces of the upper posterior teeth are on a curve which is convex downwardly from front to rear to match the curve of the cusps of the lower teeth. On the other hand, in denture prosthesis it has been found desirable to locate the cusps on the occlusal surfaces in single planes instead of on curves as are the natural teeth.

The curves mentioned in the preceding paragraph are known as compensating curves or the curves of Spee. They vary in different mouths. Disposition in denture prosthesis of the cusps in a single plane has been found best suited for accommodating artificial teeth to different mouths without custom making the teeth in accordance with the different curves of Spee in each mouth.

Artificial teeth with the cusps on the occlusal surfaces in single planes have been previously proposed. Various nonanatomic cusp forms have also been proposed for the single plane occlusal surfaces of the teeth. In one type of cusp form, the cusps have been defined by curved grooves in an effort to avoid cusp interference in mandible movement.

These prior forms of posterior teeth with the cusps on the occlusal surfaces in a single plane have, however, sacrificed masticating efficiency in an effort to avoid cusp interference. It has been proposed, for example, in certain prior art curved groove formations to have the cusps not only on the working or chewing side of the mouth engage in the grooves in the occlusal surfaces of the teeth on the opposite jaw on that side, but also to have the cusps on the opposite or balancing side of the mouth engage in the grooves in the occlusal surfaces of the teeth on the opposite jaw on that side in mandible movement.

In dental prosthesis, the bases of the artificial substitutes for natural teeth rest on relatively soft or resilient tissue instead of being fixed in the bony processes. In actual practice, it has been found that with the non-anatomic cusp forms, and particularly cusp forms in which the cusps are defined by curved grooves, the cusps on the balancing side do not fully engage in the grooves in the teeth of the opposite jaw, nor are they effectively guided on the apices of the cusps of such teeth in the movements of the mandible. Masticating efficiency is, therefore, sacrificed and the appearance differs from the appearance of natural posterior teeth. Moreover, the desired stability of the artificial denture is not obtained.

According to the present invention, I provide an artificial tooth having an occlusal surface provided with cusps located in a single plane. The cusp formations, instead of being defined by curved grooves or other non-anatomic formations, are patterned after the cusp formations of corresponding natural teeth except only that the portions of such cusp formations which would interfere in mandible movement due to location of the apices of the cusps in a single plane are removed or eliminated to eliminate any tendency to cusp interference. The remaining parts of the cusp formation correspond substantially to the cusp formation of the corresponding natural tooth.

The chief advantage of the present invention is in the ability to provide better action and better masticating efficiency than obtained with the prior art forms of posterior teeth having the cusps located in a single plane and with, for example, curved grooves or other non-anatomic formations defining the cusps on the occlusal surface of the tooth.

Another advantage of the invention lies in the ability to provide better stability in the mouth of a denture having the new and improved posterior teeth.

A further advantage of the invention lies in the ability to provide in the new and improved posterior tooth an appearance which more closely simulates the appearance of a corresponding natural tooth.

Numerous other advantages and adaptations of the invention will be apparent from the following detailed description of the preferred form of the invention.

In order to acquaint those skilled in the art with the construction and operation of the improved form of posterior teeth embodying the present invention, I shall now describe in connection with the accompanying drawings one form of a set of artificial teeth embodying the invention.

In the drawings:

Figure 1 is a plan view showing the occlusal surfaces of four natural posterior teeth;

Figure 2 is a diagrammatic plan view showing the occlusal surfaces of eight artificial posterior teeth embodying the present invention; also the relation of four of such teeth on the right hand side, and the relation of the other four of such teeth on the left hand side of an artificial denture;

Figure 3 is a side view of the natural teeth shown in Figure 1, this view being taken from the cheek or buccal side of the teeth;

Figure 4 is a side view similar to Figure 3 of four of the artificial posterior teeth embodying the present invention;

Figure 5 is a sectional view taken on the line 5—5 of Figure 3;

Figure 6 is a sectional view taken on the line 6—6 of Figure 4;

Figure 7 is a fragmentary sectional view of a pair of cooperating natural posterior teeth, one for the maxilla or upper jaw and the other for the mandible or lower jaw, and showing the cusp interference that results when the apices of the cusps of these teeth are located in single planes;

Figure 8 is a fragmentary sectional view similar to Figure 7 of a pair of corresponding artificial posterior teeth embodying the present invention and showing the absence of cusp interference when the apices of the cusps of these teeth are located in a single plane;

Figure 9:
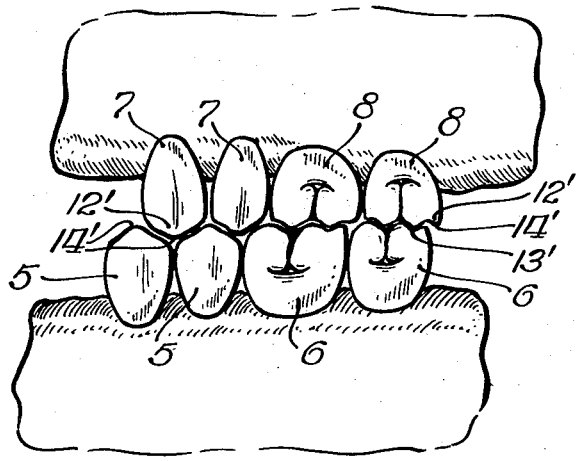
Figure 10:
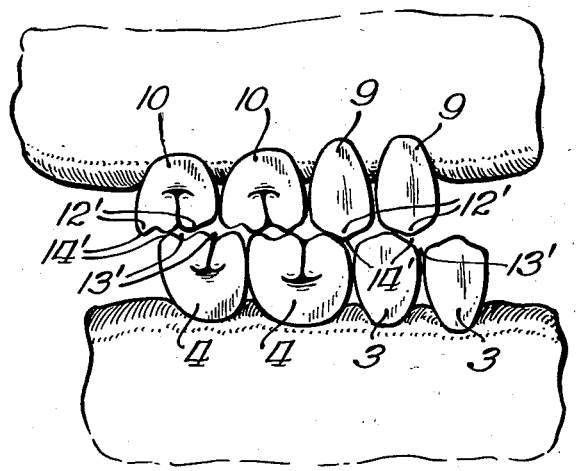

Figure 9 is a fragmentary side view of upper and lower dentures including molar and biscuspid teeth formed according to the present invention and illustrating the relation and interdigitation of the cusps on the occlusal surfaces at the working or chewing side of the mouth, this view being taken from the cheek or buccal side; and Figure 10 is a fragmentary side view similar to Figure 9 but taken from the opposite or balancing side of the mouth to show how the apices of the cusps on the teeth at this side of the denture are effectively guided on the apices of the cusps on the teeth of the opposite denture.

The drawings illustrate in Figure 2, taken in conjunction with Figures 9 and 10, the invention applied to the case where all the posterior teeth in both the upper and lower jaws are replaced by artificial teeth.

It is to be understood, however, that the invention is also applicable in cases requiring full upper and partial lower replacement of the posterior teeth; full lower and partial upper replacement; and partial upper and partial lower replacement of the posterior teeth. It is to be further understood that the teeth of the present invention may, within the scope of the appended claims, be used not only on full removable dentures, but also on removable as well as stationary partial dentures or bridge work.

The points shown at 1 and 2 in Figure 2 represent respectively the right and left centers of rotation about which the mandible moves. The right hand portion of Figure 2 shows two right lower bicuspid teeth 3, and two right lower molar teeth 4. The left hand portion of Figure 2 shows two left lower bicuspid teeth 5, and two lower molar teeth 6.

As shown in Figure 9, the upper right hand posterior teeth include two bicuspid teeth 7 and two molar teeth 8, the occlusal surfaces of which cooperate with and are complementary to the occlusal surfaces of the lower left hand bicuspids 5 and lower left hand molars 6. The upper right hand posterior teeth (Figure 10) include two bicuspid teeth 9 and two molar teeth 10, the occlusal surfaces of which cooperate with and are complementary to the occlusal surfaces of the lower right hand bicuspids 3 and lower left hand molars 4.

The natural posterior teeth 11, as shown in Figures 1, 3, and 5, have cusps 12 on their occlusal surfaces. These cusps 12 are defined by depressions or recesses 13. As shown in Figure 3, the apices 14 of the cusps 12 on the occlusal surfaces of the lower natural posterior teeth are on a curve shown by the dot and dash line a—a, which is concave downwardly from front to rear of the mouth. The apices of the cusps on the occlusal surfaces of the upper natural posterior teeth (not shown) are on a curve which is convex downwardly from front to rear of the mouth to match the curve of the cusps on the lower teeth.

According to the present invention, I make tooth patterns having cusp formations on their occlusal surfaces corresponding with the cusp formations on the occlusal surfaces of corresponding natural posterior teeth. The tooth patterns may be formed of wax or other suitable pattern material.

The posterior tooth patterns are then set up for the upper and lower jaws on an articulator and with the apices of the cusps of the tooth patterns for one jaw in a single plane and the apices of the cusps of the tooth patterns for the other jaw also in a single plane. The articulator is then manipulated to simulate the movements or excursions of the mandible or lower jaw in order to determine the portions of the cusp formations which interfere in mandible movement due to location of the apices of the cusps in single planes instead of on the curves of Spee as in the natural posterior teeth.

Figure 2 shows at 15 the median line at which the arcs struck from the right and left centers 1 and 2 intersect. The arcs form what is known as the Gothic arch. Figure 7 shows the portions of the cusps 12 which interfere at 16 in mandible movement before removing the interfering cusp portions from the occlusal surfaces of the tooth patterns.

Upon thus ascertaining which portions of the cusp formations interfere in mandible movement, these interfering cusp formations are removed or eliminated. This may be done, for example, by carving the occlusal surfaces of the tooth patterns to remove or eliminate the interfering cusp portions, or otherwise as desired. The resulting cusp formations have the apices of the cusps in single planes.

After eliminating the interfering cusp formations, I make the artificial posterior teeth from the tooth patterns thus formed. As illustrated in Figures 2, 4, 6, 8, 9, and 10, the cusps on the occlusal surfaces of the resulting teeth are shown at 12', and the depressions or recesses defining the cusps 12' are shown at 13'. The apices 14' of the cusps are located in single planes, and, as shown in Figure 8, there is no cusp interference in mandible movement.

In the improved posterior teeth, the angles of the sides of the cusps relative to the single plane in which the apices of the cusps are disposed are preferably made less than in the prior artificial teeth with the cusps defined by curved grooves, and they are also preferably made less than the angles of corresponding anatomic teeth. In the more specific aspects of the invention, it is contemplated that these angles will not exceed about 20 degrees, although the angles of the sides of the cusps may vary within the broader aspects of the invention.

In use of cooperating artificial dentures for upper and lower jaws with four of the improved posterior teeth of the present invention on each side of each jaw, the cusps on the working or chewing side interdigitate as shown in Figure 9 in mandible movement. In other words, when the lower jaw is moved laterally toward the right or left, the cusps on each lower posterior tooth will move freely through the depressions or recesses 13' in the opposing teeth on the working or chewing side of the mouth. At the same time the apices 14' of the cusps 12' on the teeth on the opposite or balancing side of the lower denture are effectively guided as shown in Figure 10 on the apices of the cusps on the opposing teeth on the balancing side of the mouth.

By the structure shown and described, cusp interference between the teeth is eliminated and, at the same time, better masticating efficiency is obtained. Moreover, with the improved tooth structure of the present invention it is possible to provide posterior teeth which more closely simulate the appearance of corresponding natural teeth but with which the cusp interference, which would result if teeth of natural form were arranged with the apices of the cusps thereof in single planes, is avoided.

In the preferred form of the improved teeth of the present invention, the bodies of the teeth are made narrower buccally lingually than the bodies of corresponding natural posterior teeth. This narrowing of the bodies of the improved teeth buccally lingually may be omitted or varied within the broader aspects of the invention. However, stability of removable dentures in the mouth is improved where the improved teeth are narrower buccally lingually than corresponding natural teeth.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. An artificial posterior tooth having an occlusal surface provided with a cusp formation of modified anatomic form patterned after and following the cusp formation of a corresponding natural tooth except only that the cusps of said cusp formation have their apices located in a single plane and the portions of said cusp formation which would interfere in mandible movement due to such location of the apices of the cusps in a single plane are eliminated, the cusp formation otherwise corresponding to the cusp formation of a corresponding natural posterior tooth.

2. An artificial posterior tooth according to claim 1 wherein the body of the tooth is narrower buccally lingually than a corresponding natural posterior tooth.

3. An artificial posterior tooth according to claim 1 wherein the angles of the sides of the cusps do not exceed angles of about 20 degrees.

4. An artificial tooth having the sides, occlusal surface and cusp formation on such occlusal surface corresponding with the sides, occlusal surface and cusp formation of a corresponding natural tooth except that the occlusal surface and cusp formation thereon are of modified anatomic form having the apices of the cusps thereon located in a single plane at substantially right angles to the vertical axis of the tooth and the portions of the cusp formation which would interfere in mandible movement due to the location of the apices of the cusps in a single plane are eliminated to eliminate any tendency to cusp interference, the remaining portions of the cusp formation corresponding substantially to the cusp formation of a corresponding natural tooth.

5. In combination, cooperating artificial dentures having a plurality of posterior teeth thereon arranged to cooperate with the teeth of the other denture, the posterior teeth of each denture having cusp formations of modified anatomic form corresponding with the cusp formations on the occlusal surfaces of corresponding natural posterior teeth except only that the apices of the cusps of the posterior teeth of each denture are located in a single plane and the portions of said cusp formations which would interfere in mandible movement due to such location of the apices of the cusps in a single plane are eliminated to eliminate any tendency to cusp interference, the remaining portions of the cusp formations corresponding to the cusp formations of corresponding natural posterior teeth and the angles of the sides of the cusps not exceeding angles of about 20 degrees whereby in use the cusps of one denture on the working side of the mouth engage between the cusps of the opposite denture and, on the balancing side of the mouth, the apices of the cusps on the teeth of one denture are effectively guided on the apices of the cusps on the teeth of the opposite denture.

6. Artificial dentures according to claim 5 wherein the bodies of the artificial posterior teeth are narrower buccally lingually than corresponding natural posterior teeth.

7. Artificial dentures according to claim 5 wherein the bodies of the artificial posterior teeth are narrower buccally lingually than the bodies of corresponding natural posterior teeth, and wherein the sides of the artificial posterior teeth correspond in general to the sides of corresponding natural posterior teeth.

RALPH L. FOLSOM.

REFERENCES CITED

The following references are of record in the file of this patent:

UNITED STATES PATENTS

| Number | Name | Date |
|---|---|---|
| 1,751,178 | Taeschner | Mar. 18, 1930 |
| 1,837,042 | Hall | Dec. 15, 1931 |
| 2,129,040 | Sears | Sept. 6, 1938 |
| 2,417,965 | Beresin | Mar. 25, 1947 |

OTHER REFERENCES

Sears, Victor, "Non-Anatomic Tooth Forms," Dental Survey, September 1935, pgs. 35-38 (see pg. 36).